United States Patent Office 3,635,966
Patented Jan. 18, 1972

3,635,966
6-SUBSTITUTED-INDOLO[1,2-c]QUINAZOLINES
Robert Louis Duncan, Jr., Richmond, Va., assignor to
A. H. Robins Company, Inc., Richmond, Va.
No Drawing. Filed Oct. 22, 1969, Ser. No. 868,612
Int. Cl. C07d 59/14
U.S. Cl. 260—247.5 R          6 Claims

ABSTRACT OF THE DISCLOSURE 6-substituted-indolo[1,2-c]quinazolines useful as sedatives are disclosed. The novel compounds of the invention are prepared by reacting 6-halomethylindolo[1,2-c]quinazolines with nitrogen-containing heterocyclic compounds.

The present invention relates to novel heterocyclic compounds, and more particularly to 6-substituted-indolo-[1,2-c]quinazolines, compositions containing the same and to methods for making and usin gthem.

The invention is especially concerned with 6-substituted-indolo[1,2-c]quinazolines having the formula:

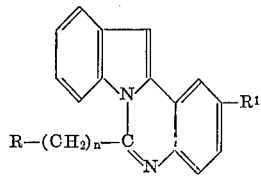

Formula I wherein:
R is pyrrolidino, morpholino, 4-methylpiperazino, 4-phenylpiperazino, 1-acetylpiperid-4-yl, piperidino, 4-phenylpiperidino, and 3-pyrrolino wherein said phenyl is unsubstituted phenyl and monosubstituted phenyl wherein the monosubstituent is selected from lower alkyl, lower alkoxy, trifluoromethyl and halogen of atomic weight less than eighty, $R_1$ is hydrogen, lower alkyl, lower alkoxy, trifluoromethyl and halogen of atomic weight less than eighty, $n$ is zero and one, and Pharmaceutically acceptable acid addition salts thereof.

The compounds of the foregoing Formula I may be prepared according to the following general scheme:

A starting indolo[1,2-c]quinazoline of the formula:

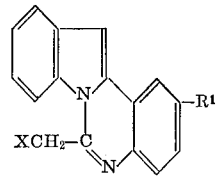

Formula II wherein $R_1$ has the meaning assigned in Formula I and X is a halogen atom, is reacted in a conventional halogen displacement reaction with a heterocyclic amine of the formula:

RH          (Formula III)

wherein R is the heterocyclic amino remainder of the molecule which is desired to be introduced into the methyl chain at the 6-position of the indolo[1,2-c]quinazoline ring, to split out a hydrogen halide.

A further procedure for preparing the compounds of the present invention (I) comprises the step of reacting a compound of the formula:

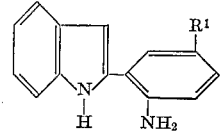

Formula IV wherein $R^1$ has the meaning assigned in Formula I with an acid halide of the formula:

RCOX          (Formula V)

wherein R is the heterocyclic amino remainder of the molecule which is desired to be introduced into the 6-position of the indolo[1,2-c]quinazoline ring.

As a general procedure for the halogen displacement reaction between a compound of Formula II and a compound of Formula III, the following is representative:

A mixture of the 6-halomethylindolo[1,2-c]quinazoline (II), the heterocyclic amine (III) and an alkali metal carbonate in an inert dry organic solvent is stirred, preferably at the reflux temperature of the selected organic solvent, for a period of from about 6 hours to about 19 hours. The reaction can be followed by thin layer chromatography and when the reaction has been completed the inorganic salts are removed from the reaction mixture by washing the organic layer with water. The washed organic layer is dried using a suitable drying agent and the organic solvent evaporated leaving the desired basic compound (I) which is purified by crystallization from a suitable solvent or by converting the basic compound to a suitable acid addition salt which is further purified by crystallization.

In the general procedure described above, the heterocyclic amine (III) is usually employed in a 10–100% molar excess. Among the alkali metal carbonates which can be used, potassium carbonate is preferred. A variety of organic solvents such as benzene, toluene and xylene can be used, toluene being preferred.

As a general procedure for the cyclization reaction between a compound of Formula IV and a compound of Formula V, the following is representative:

Equimolar amounts of a 2-(2-aminophenyl)indole (IV) and an acid halide (V) are combined in a dry inert organic solvent and the resulting solution refluxed for a period of from about 4 hours to about 10 hours. Following the reflux period the reaction mixture is washed with water, the organic aqueous layers separated, the organic layer dried and the solvent evaporated. The residual basic compound (I) is purified by crystallization from a suitable solvent or it is converted to a suitable acid addition salt which is further purified by crystallization. Among the organic solvents which can be used, benzene and chloroform are preferred.

In general, the starting 6-halomethylindolo[1,2-c]quinazolines (II) are prepared by reacting 2-(2-aminophenyl)indoles (IV) with an haloacetyl halide in a dry inert solvent as, for example, chloroform. Under the influence of the acidic medium generated by the hydrogen halide which is formed, the intermediate 2-(2-halo-acetamidodiphenyl)indole cyclizes spontaneously to a 6-halomethylindolo[1,2-c]quinazoline (II).

The 2-(2-aminophenyl)indoles (IV) are prepared by procedures known in the art.

In the definition of terms used throughout the specification, "lower alkyl" includes groups having one to eight carbon atoms such as methyl, ethyl, propyl, isopropyl, butyl, amyl, hexyl, heptyl, octyl and the like. "Lower alkoxy" has the formula —O— lower-alkyl.

When halogen is referred to herein, preferably but not necessarily, a halogen of atomic weight less than eighty is employed.

The term "phenyl" includes the unsubstituted and mono-substituted phenyl radical. Among the suitable monosubstituted phenyl radicals are phenyl radicals substituted by any radical which is not reactive or otherwise interfering under the conditions of reaction such as lower alkyl, lower alkoxy, trifluoromethyl and halo. The lower alkyl and lower alkoxy substituents have preferably from one to to four carbon atoms which can be arranged as straight or branched chains.

This invention also includes acid addition salts of the above defined bases formed with non-toxic organic and inorganic acids. Such salts are easily prepared by methods known in the art. When the compounds are to be used as intermediates for preparing other compounds or for any other non-pharmaceutical use, the toxicity or non-toxicity of the salt is immaterial; when the compounds are to be used as pharmaceuticals, they are most conveniently used in the form of non-toxic acid addition salts. Both toxic and non-toxic salts are therefore within the purview of the invention. The acids which can be used to prepare the preferred non-toxic acid addition salts are those which produce, when combined with the free base, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in an aqueous miscible solvent, such as ethanol or isopropanol, with isolation of the salt by concentration and cooling, or the base is reacted with an excess of the acid in an aqueous immiscible solvent, such as ethyl ether or isopropyl ether, with the desired salt separating directly. Exemplary of such organic salts are those with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

The compounds of the present invention have useful pharmacological properties. They have been found useful for administering to laboratory animals in studying the behavior thereof and in studying drug effects on the central nervous system. The compounds corresponding to Formula I have been found to be particularly useful as sedatives. They are active in mice and rats in intraperitoneal doses of 2–100 mg./kg. when evaluated in the standard test procedures in which animals are administered a compound and observed for behavioral effects.

It is, accordingly, an object of the present invention to provide novel indolo[1,2-c]quinazolines which are useful as sedatives. A further object is to provide methods for the preparation of the novel indolo[1,2-c]quinazolines of the present invention. Additional objects will be apparent to one skilled in the art and still other objects will become apparent hereinafter.

PREPARATION OF INTERMEDIATES

Preparation 1

2-(2 - aminophenyl)indole.—A mixture of 150.0 g. (0.67 mole) of 2-aminoacetophenone phenylhydrazone and 500.0 g. of polyphosphoric acid was stirred on a steam bath until a color change from yellow to brown appeared. The stirred mixture was cooled in an ice bath while an exothermic reaction occurred, raising the pot temperature to 125° C. An excess of cold water was added to the cooled reaction mixture to decompose the excess polyphosphoric acid. The mixture was filtered and the solid residue was stirred with sodium hydroxide solution. The basic solution was extracted with ether and the combined ether extracts were dried and concentrated. The solid residue was recrystallized from methanol and 75 g. (54%) of product melting at 153–154° C. was obtained.

*Analysis.*—Calculated for $C_{14}H_{12}N_2$: N, 13.45%. Found: N, 13.32%.

Preparation 2

2-(2-amino-5-chlorophenyl)indole.—A mixture of 2.0 g. (0.039 mole) of 2-amino - 5 - chloroacetophenone phenylhydrazone and 50.0 g. of polyphosphoric acid was stirred and heated to 125–130° C. At this point an exothermic reaction raised the temperature to 150° C. The mixture was stirred with the temperature held between 140–150° C. for 10 minutes. The mixture was cooled and an excess of water was added. The solid which separated was collected by filtration and partitioned between dilute sodium hydroxide and ether. The ether layer was dried and concentrated. The indole which weighed 7.9 g. (85% yield) was recrystallized from chloroform and melted at 102–105° C.

*Analysis.*—Calculated for $C_{14}H_{11}ClN_2$ (percent): C, 69.28; H, 4.57; N, 11.54. Found (percent): C, 68.91; H, 4.51; N, 11.46.

Preparation 3

2-(2-amino-5-bromophenyl)indole.—A mixture of 6.5 g. (0.021 mole) of 2 - amino - 5 - bromoacetophenone phenylhydrazone and 20 g. of polyphosphoric acid was heated to about 100° C., at which point an exothermic reaction occurred raising the pot temperature to 130° C. The temperature was maintained at 130° C. for 10 minutes. The mixture was cooled to about 90° C. and an excess of water was added. The mixture was filtered and the collected solid was dissolved in ethanol and the solution was made basic. The base insoluble product was extracted with chloroform and the combined extracts were dried and concentrated. The residue was recrystallized from ethanol and 3.5 g. (60% yield) of product was obtained which melted at 137–140° C.

*Analysis.*—Calculated for $C_{14}H_{11}BrN_2$ (percent): C, 58.55; H, 3.86; N, 9.76. Found (percent): C, 58.73; H, 3.92; N, 9.59.

Using procedures analogous to Preparations 1 through 3, the following 2-(2-amino-5-substituted-phenyl)indoles are prepared:

2 - (2-amino-5-methoxyphenyl)indole is prepared by reacting 2 - amino-5-methoxyacetophenone phenylhydrazone and polyphosphoric acid;

2 - (2 - amino - 5 - trifluoromethylphenyl)indole is prepared by reacting 2 - amino - 5 - trifluoromethylacetophenone phenylhydrazone and polyphosphoric acid;

2 - (2 - amino -5 - methylphenyl)indole is prepared by reacting 2 - amino - 5 - methylacetophenone phenylhydrazone and polyphosphoric acid; and 2 - (2 - amino - 5 - ethylphenyl)indole is prepared by reacting 2 - amino - 5 - ethylacetophenone phenylhydrazone and polyphosphoric acid.

Preparation 4

6 - chloromethylindolo[1,2-c]quinazoline.—A solution of 1.1 g. (0.01 mole) of chloroacetylchloride in 25 ml. of chloroform was added dropwise to a stirred solution of 2.1 g. (0.01 mole) of 2-(2-aminophenyl)indole. An orange solid precipitated from the reaction mixture and was collected by filtration. The crude solid was crystallized from ethanol. The product, obtained as yellow needles, melted at 186–188° C. and weighed 2.4 g. (88% yield).

*Analysis.*—Calculated for $C_{16}H_{11}ClN_2$ (percent): C, 72.05; H, 4.16; N, 10.50. Found (percent): C, 71.88; H, 4.17; N, 10.27.

Preparation 5

2 - chloro - 6 - chloromethylindolo[1,2-c]quinazoline.—
To a warmed, stirred solution of 2.0 g. (0.008 mole) of 2 - (2 - amino - 5 - chlorophenyl)indole and 50 ml. of chloroform was added dropwise 1.0 g. (0.009 mole) of chloroacetylchloride. Stirring was continued for 15 minutes, the solid material was collected by filtration and recrystallized from 95% ethanol. The product melted at 213–214° C. and weighed 1.3 g.

*Analysis.*—Calculated for $C_{16}H_{10}Cl_2N_2$ (percent): C, 63.80; H, 3.35; N, 9.30. Found (percent): C, 63.71; H, 3.29; N, 9.19.

Utilizing the procedures of Preparations 4 and 5, the following 2 - substituted - 6 - halomethylindolo[1,2-c] quinazolines are prepared by reacting a 2-(2-amino-5-substituted-phenyl)indole with a haloacetylhalide;

2-bromo-6-halomethylindolo[1,2-c]quinazoline;
2-methoxy-6-halomethylindolo[1,2-c]quinazoline;
2-trifluoromethyl-6-halomethylindolo[1,2-c]quinazoline;
2-methyl-6-halomethylindolo[1,2-c]quinazoline; and
2-ethyl-6-halomethylindolo[1,2-c]quinazoline.

EXAMPLE 1

6-pyrrolidinomethylindolo[1,2-c]quinazoline

A stirred mixture of 8.0 g. (0.030 mole) of 6-chloromethylindolo[1,2-c]quinazoline, 2.9 g. (0.040 mole) of pyrrolidine, 15 g. of potassium carbonate and 125 ml. of toluene was refluxed 16 hours. Approximately 100 ml. of water was added to the cooled reaction mixture. The organic layer was separated, dried over magnesium sulfate and the solvent was evaporated. The residual oil which crystallized on cooling was recrystallized from isopropyl ether yielding 5.5 g. (60% yield) of product melting at 122–125° C. The melting point was raised to 124–125° C. by a second crystallization using the same solvent.

*Analysis.*—Calculated for $C_{20}H_{19}N_3$ (percent): C, 79.70; H, 6.35; N, 13.94. Found (percent): C, 79.65; H, 6.43; N, 13.94.

EXAMPLE 2

6-morpholinomethylindolo[1,2-c]quinazoline

A stirred mixture of 5.4 g. (0.020 mole) of 6-chloromethylindolo[1,2-c]quinazoline, 2.3 g. (0.027 mole) of morpholine, 1.0 g. potassium carbonate and 85 ml. of toluene was refluxed 16 hours. Thin layer chromatography indicated that the reaction was not complete and 10 g. of morpholine was added. The mixture was refluxed an additional three hours, cooled and treated with 100 ml. of water. The organic layer was separated, washed with water, dried over magnesium sulfate and the solvent was evaporated. The residual oil which crystallized on cooling was recrystallized from a benzene-isopropyl ether mixture yielding 3.8 g. (60% yield) of product which melted at 188–190° C.

*Analysis.*—Calculated for $C_{20}H_{19}N_3O$ (percent): C, 75.69; H, 6.03 N, 13.24. Found (percent): C, 75.92; H, 5.83; N, 12.98.

EXAMPLE 3

6-(4-methylpiperazinomethyl)indolo[1,2-c]quinazoline

A stirred mixture of 5.5 g. (0.021 mole) of 6-chloromethylindolo[1,2-c]quinazoline, 2.5 g. (0.025 mole) of 4-methylpiperazine, 10 g. of potassium carbonate and 75 ml. of toluene was refluxed six hours, cooled and treated with 100 ml. of water. The organic layer was separated, washed with cold water, dried over magnesium sulfate and concentrated. The light yellow crystalline residue was recrystallized from an isopropyl ether-isooctane mixture. The product weighed 3.5 g. (51% yield) and melted at 144–145° C.

*Analysis.*—Calculated for $C_{21}H_{22}N_4$ (percent): C, 76.33; H, 6.72. Found (percent): C, 76.58; H, 6.92.

EXAMPLE 4

6-(4-phenylpiperazinomethyl)indolo[1,2-c]quinazoline

A mixture of 4.5 g. (0.017 mole) of 6-chloromethylindolo[1,2-c]quinazoline, 5.5 g. (0.034 mole) of 4-phenylpiperazine, 10 g. of potassium carbonate and 100 ml. of dry toluene was stirred and refluxed 16 hours. The mixture was treated with water and the solid which precipitated was filtered from the reaction mixture and recrystallized from benzene. The product weighed 4.3 g. (65% yield) and melted at 224–226° C.

*Analysis.*—Calculated for $C_{26}H_{24}N_4$ (percent): C, 79.56; H, 6.16; N, 14.27. Found (percent): C, 79.82; H, 6.15; N, 14.02.

EXAMPLE 5

6-(1-acetylpiperid-4-yl)indolo[1,2-c]quinazoline

A mixture of 5.0 g. (0.024 mole) of 2-(2-aminophenyl)indole and 4.55 g. (0.024 mole) of 1-acetylisonipecotic acid chloride in 100 ml. of benzene was refluxed eight hours. The reaction mixture was cooled and an excess of water was added. The mixture was basified, and the aqueous layer was extracted with benzene. The benzene extracts were dried over anhydrous sodium sulfate and concentrated. The residual solid was crystallized from methanol yielding 4.5 g. (55%) of product which melted at 243–247° C.

*Analysis.*—Calculated for $C_{22}H_{21}N_3O$ (percent): C, 76.94; H, 6.16; N, 12.24. Found (percent): C, 76.47; H, 6.11; N, 12.15.

Utilizing the procedures of Examples 1 through 5, the following 6 - substituted - indolo[1,2-c]quinazolines are prepared from the stated ingredients:

2 - chloro - 6 - piperidinomethylindolo[1,2-c]quinazoline is prepared by reacting 2 - chloro - 6 - chloromethylindolo[1,2-c]quinazoline with piperidine;

2 - trifluoromethyl - 6 - morpholinomethylindolo[1,2-c]quinazoline is prepared by reacting 2 - trifluoromethyl-6 - chloromethylindolo[1,2-c]quinazoline with morpholine;

2-methyl-6-[4-(p-tolyl)piperazinomethyl]indolo[1,2-c] quinazoline is prepared by reacting 2-methyl-6-chloromethylindolo[1,2-c]quinazoline with 4-(p-tolyl)piperazine;

2-bromo-6-(3-pyrrolin-1-ylmethyl)indolo[1,2 - c]quinazoline is prepared by reacting 2-bromo-6-chloromethylindolo[1,2-c]quinazoline with 3-pyrroline;

2-chloro-6-(4-methylpiperazinomethyl)indolo[1,2 - c] quinazoline is prepared by reacting 2-chloro-6-chloromethylindolo[1,2-c]quinazoline with 4-methylpiperazine;

2-trifluoromethyl-6-[4-(3-trifluoromethylphenyl)piperazinomethyl]indolo[1,2-c]quinazoline is prepared by reacting 2-trifluoromethyl-6-chloromethylindolo[1,2 - c]quinazoline with 4-(3-trifluoromethylphenyl)piperazine;

2-methoxy-6-[4-(p-anisyl)piperidinomethyl]indolo[1,2-c]quinazoline is prepared by reacting 2-methoxy-6-chloromethylindolo[1,2-c]quinazoline with 4-(p-anisyl)piperidine;

2-chloro-6-[4 - (4 - chlorophenyl)piperazinomethyl]indolo[1,2-c]quinazoline is prepared by reacting 2-chloro-6-chloromethylindolo[1,2-c]quinazoline with 4-(4-chlorophenyl)piperazine; and 2-ethyl-6-[4-(3-trifluoromethylphenyl)piperidinomethyl] indolo[1,2-c]quinazoline is prepared by reacting 2-ethyl-6-chloromethylindolo[1,2-c]quinazoline with 4 - (3 - trifluoromethylphenyl)piperidine.

FORMULATION AND ADMINISTRATION

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic and silicic acids, magnesium stearate, and polyvinyl pyrrolidone.

For parenteral administration the carrier or excipient may be a sterile, parenterally acceptable liquid; e.g., water or a parenterally acceptable oil; e.g., arachis oil contained in ampules.

Advantageously, the composition may be formulated as dosage units, each unit being adapted to supply a fixed dose of active ingredients. Tablets, capsules, coated tablets and ampules are examples of preferred dosage unit forms according to the invention. Although small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending, of course, upon the emergency of the situation and the particular result desired. Five to fifty milligrams appear to be optimum per unit dose, while usual broader ranges appear to be one to 500 milligrams per unit dose. It is only necessary that the active ingredient constitute an effective amount; i.e., such that a suitable effective dosage will be obtained consistent with the dosage form employed. Obviously, several unit dosage forms may be administered at about the same time.

The following are examples of compositions formed in accordance with this invention.

(1) Capsules.—Capsules of 5, 25 and 50 mg. of active ingredient per capsule are prepared. With the higher amounts of active ingredient, reduction may be made in the amount of lactose.

Typical blend for encapsulation:           Per capsule, mg.
    Active ingredient _____     5.0
    Lactose _____   296.7
    Starch _____   129.0
    Magnesium stearate _____     4.3
                                            ─────
    Total _____   435.0

(2) Tablets.—A typical formulation for a tablet containing 5 mg. of active ingredient per tablet follows. The formulation may be used for other strengths of active ingredient by adjustment of weight of dicalcium phosphate.

Per tablet, mg.
(1) Active ingredient _____     5.0
(2) Corn starch _____    13.6
(3) Corn starch (paste) _____     3.4
(4) Lactose _____    79.2
(5) Dicalcium phosphate _____    68.2
(6) Calcium stearate _____     0.9
                                            ─────
    Total _____   170.3

Uniformly blended 1, 2, 4, and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows: 50 mg. tablet:

Ingredients:                              Per tablet, mg.
    Active ingredient _____    50.0
    Lactose _____    90.0
    Milo starch _____    20.0
    Corn starch _____    38.0
    Calcium stearate _____     2.0
                                            ─────
    Total _____   200.0

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable—2% sterile solution:         Per cc.
    Active ingredient _____  20 mg.
    Preservative, e.g., chlorobutanol ___  0.5% wt./vol.
    Water for injection _____  Q.s.

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:

1. A compound selected from (a) 6-substituted-indolo-[1,2-c]quinazolines, the free base having the formula:

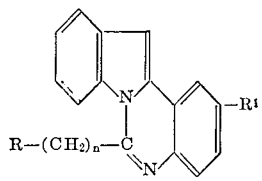

wherein:

R is pyrrolidino, morpholino, 4-methylpiperazino, 4-phenylpiperazino, 1-acetylpiperid-4-yl, piperidino, 4-phenylpiperidino and 3-pyrrolino, wherein said phenyl is unsubstituted phenyl and monosubstituted phenyl, wherein the monosubstituent is selected from lower alkyl, lower alkoxy, trifluoromethyl and halogen of atomic weight less than eighty;

$R^1$ is hydrogen, lower alkyl, lower alkoxy, trifluoromethyl and halogen of atomic weight less than eighty, n is zero and one, and (b) non-toxic acid addition salts thereof.

2. A compound according to claim 1 which is 6-(4-methylpiperazinomethyl)indolo[1,2-c]quinazoline.

3. A compound according to claim 1 which is 6-(4-phenylpiperazinomethyl)indolo[1,2-c]quinazoline.

4. A compound according to claim 1 which is 6-pyrrolidinomethylindolo[1,2-c]quinazoline.

5. A compound according to claim 1 which is 6-morpholinomethylindolo[1,2-c]quinazoline.

6. A compound according to claim 1 which 6-(1-acetylpiperid-4-yl)indolo[1,2-c]quinazoline.

References Cited

UNITED STATES PATENTS 3,509,147   4/1970   Houlihan _____ 260—256.4 Q

ALEX MAZEL, Primary Examiner

R. J. GALLAGHER, Assistant Examiner

U.S. Cl. X.R.

260—247.1, 247.2 R, 251, 256.5 R, 326.15; 424—200, 248, 251